(12) United States Patent
Madhani et al.

(10) Patent No.: US 10,521,654 B2
(45) Date of Patent: Dec. 31, 2019

(54) RECOGNITION OF HANDWRITTEN CHARACTERS IN DIGITAL IMAGES USING CONTEXT-BASED MACHINE LEARNING

(71) Applicant: FMR LLC, Boston, MA (US)

(72) Inventors: Sunil Madhani, Cary, NC (US); Fabrizio Machado, Medford, MA (US); Christopher A. McDermott, Barrington, RI (US); Jordan Donofrio, Boston, MA (US); Tobias Donath, Natick, MA (US)

(73) Assignee: FMR LLC, Boston, MA (US)

( * ) Notice: Subject to any disclaimer, the term of this patent is extended or adjusted under 35 U.S.C. 154(b) by 110 days.

(21) Appl. No.: 15/940,880

(22) Filed: Mar. 29, 2018

(65) Prior Publication Data

US 2019/0303662 A1    Oct. 3, 2019

(51) Int. Cl.
*G06K 9/00* (2006.01)
*G06K 9/62* (2006.01)

(52) U.S. Cl.
CPC ..... *G06K 9/00422* (2013.01); *G06K 9/00449* (2013.01); *G06K 9/00456* (2013.01); *G06K 9/6202* (2013.01)

(58) Field of Classification Search
None
See application file for complete search history.

(56) References Cited

U.S. PATENT DOCUMENTS 7,460,712 B2    12/2008  Thiesson et al.
9,384,423 B2     7/2016  Rodriguez-Serrano et al.
9,886,626 B1 *   2/2018  Stout .................. G06K 9/00436
2012/0134576 A1* 5/2012  Sharma ............... G06K 9/4604
                                                        382/155
2014/0164974 A1* 6/2014  Kim .................... G06F 3/04883
                                                        715/773

(Continued)

OTHER PUBLICATIONS

Haluptzok, Patrick, Michael Revow & Ahmad Abdulkader, "Personalization of an Online Handwriting Recognition System," Guy Lorette, Tenth International Workshop on Frontiers in Handwriting Recognition, Oct. 5, 2006, La Baule (France), Suvisoft 2006, 6 pages.

(Continued)

*Primary Examiner* — Vikkram Bali
(74) *Attorney, Agent, or Firm* — Proskauer Rose LLP (57) ABSTRACT

Methods and apparatuses are described for of recognizing handwritten characters in digital images using context-based machine learning. A server captures an image of a document that comprises one or more handwritten data fields, the document associated with a user identifier. The server identifies a field type for each handwritten data field in the image. The server creates a pixel intensity array for each character in each handwritten data field and determines whether a user-specific character map exists for the user identifier. If a map exists, the server retrieves the map and generates digital form data by executing a user-specific handwriting classifier using the map, the pixel intensity arrays, and the field types. If a map does not exist, the server builds a map based upon the pixel intensity arrays and generates digital form data by executing a baseline handwriting classifier using the map, the pixel intensity arrays, and the field types.

28 Claims, 7 Drawing Sheets

(56) References Cited

U.S. PATENT DOCUMENTS

2016/0012315 A1    1/2016  Perrin et al.

OTHER PUBLICATIONS

Kienzle, Wolf & Kumar Chellapilla, "Personalized Handwriting Recognition via Biased Regularization," Microsoft Research, Proceedings of the 23rd International Conference on Machine Learning, Pittsburgh, PA, 2006, 8 pages.

Perwej, Yusuf & Ashish Chaturvedi, "Neural Networks for Handwritten English Alphabet Recognition," International Journal of Computer Applications, vol. 20, No. 7 (Apr. 2011), 5 pages.

* cited by examiner

304a → First Name: _Bill_ ← 304b
Last Name: _Smith_
D.O.B.: _11/14/64_
Street: _22 Elm St._
City: _Anywhere_
State: _NY_
ZIP: _01234_
Phone: _555-9454_

} 302

*Example of a Physical Document*

FIG. 4A

*From FIG. 4A*

Create pixel intensity array for each character
408

|   |   |   |   |   |   |   |   |   |   |
|---|---|---|---|---|---|---|---|---|---|
| A | B |   | N | E |   |   |   | S |   |
|   |   |   | h | y |   |   |   | m |   |
| e |   |   | r | i |   |   | l | w | n |
| y | 9 | 0 | 1 | 2 | 3 | 4 | 5 | 6 |   |
|   |   |   |   | t |   |   |   |   |   |

User-Specific Character Map 602

FIG. 6

RECOGNITION OF HANDWRITTEN CHARACTERS IN DIGITAL IMAGES USING CONTEXT-BASED MACHINE LEARNING

TECHNICAL FIELD

This application relates generally to methods and apparatuses, including computer program products, for recognizing handwritten characters in digital images using context-based machine learning.

BACKGROUND

Despite advances in paperless systems and technology, many companies still receive physical, handwritten documents containing highly-sensitive information from customers. Over the years, handwriting recognition software (typically using optical character recognition (OCR) techniques), has had some commercial success in determining the content of handwritten forms and other documents when converted into a digital version, such as an image. However, the accuracy of currently available commercial solutions has been a barrier to scale automation of physical document processing. For example, current solutions based on OCR offer handwriting recognition accuracy of approximately 90%, which is unacceptable when important information (e.g., social security numbers, account numbers, etc.) must be recognized without any errors. Due to its limitations, OCR is seen merely as a complement to trained human document reviewers and doesn't yield end-to-end automation.

With the recent popularity of machine learning and neural network algorithms, accuracy has improved—currently-available handwriting recognition software based on machine learning and neural networks is generally 95% accurate. However, this level of accuracy is still insufficient as errors continue to occur.

SUMMARY

Therefore, what is needed are automated systems and methods for recognition of user-specific handwriting from digital images that correspond to physical documents, using bias-influenced, context-based machine learning to improve accuracy and speed. The techniques described herein provide the advantage of a streamlined neural network that analyzes handwritten data using document context (e.g., form field types and other metadata about the document) and user-specific context (e.g., prior handwriting from the individual user) to adjust the machine learning classifier to recognize and verify a user's unique handwriting more accurately and effectively.

The invention, in one aspect, features a system for recognizing handwritten characters in digital images using context-based machine learning. The system comprises a server computing device including a memory for storing programmatic instructions and a processor for executing the programmatic instructions and a database coupled to the server computing device. The processor of the server computing device executes the programmatic instructions to capture a digital image of a physical document that comprises one or more handwritten data fields, the physical document associated with a user identifier. The processor of the server computing device executes the programmatic instructions to identify a field type for each handwritten data field in the digital image. The processor of the server computing device executes the programmatic instructions to create, for each handwritten data field in the digital image, a pixel intensity array for each character in the handwritten data field. The processor of the server computing device executes the programmatic instructions to determine whether a user-specific character map exists for the user identifier. If a user-specific character map exists for the user identifier, the processor of the server computing device executes the programmatic instructions to retrieve the user-specific character map and generate, for each handwritten data field in the physical document, digital form data by executing a user-specific handwriting classifier using the user-specific character map, the created pixel intensity array for the handwritten data field, and the field type for the handwritten data field. If a user-specific character map does not exist for the user identifier, the processor of the server computing device executes the programmatic instructions to build a user-specific character map based upon the created pixel intensity arrays and generate, for each handwritten data field in the physical document, digital form data by executing a baseline handwriting classifier using the user-specific character map, the created pixel intensity array for the handwritten data field, and the field type for the handwritten data field.

The invention, in another aspect, features a computerized method of recognizing handwritten characters in digital images using context-based machine learning. A server computing device captures a digital image of a physical document that comprises one or more handwritten data fields, the physical document associated with a user identifier. The server computing device identifies a field type for each handwritten data field in the digital image. The server computing device creates, for each handwritten data field in the digital image, a pixel intensity array for each character in the handwritten data field. The server computing device determines whether a user-specific character map exists for the user identifier. If a user-specific character map exists for the user identifier, the server computing device retrieves the user-specific character map and generates, for each handwritten data field in the physical document, digital form data by executing a user-specific handwriting classifier using the user-specific character map, the created pixel intensity array for the handwritten data field, and the field type for the handwritten data field. If a user-specific character map does not exist for the user identifier, the server computing device builds a user-specific character map based upon the created pixel intensity arrays and generates, for each handwritten data field in the physical document, digital form data by executing a baseline handwriting classifier using the user-specific character map, the created pixel intensity array for the handwritten data field, and the field type for the handwritten data field.

Any of the above aspects can include one or more of the following features. In some embodiments, identifying a field type for each handwritten data field in the digital image comprises determining a location of each handwritten data field in the digital image; mapping the location of each handwritten data field in the digital image to layout data associated with the physical document, the layout data comprising a field type for each handwritten data field in the digital image; identifying the field type for each handwritten data field in the digital image based upon the mapped location; and retrieving metadata associated with a context of each handwritten data field in the digital image. In some embodiments, retrieving metadata associated with a context of each handwritten field in the digital image comprises, for each handwritten data field in the digital image: if metadata associated with a context of the handwritten data field exists:

retrieve the metadata; if metadata associated with a context of the handwritten data field does not exist: search the digital image for one or more other handwritten data fields that have a similarity to one or more of: the location of the handwritten data field, a length of the handwritten data field, or a character type of the handwritten data field; assign a matching probability to each of the one or more other handwritten data fields in the search; and retrieve metadata associated with a context of the other handwritten data field that has a highest matching probability value.

In some embodiments, creating a pixel intensity array for each character in the handwritten data field comprises detecting each handwritten data field in the digital image; cropping a portion of the digital image at each detected handwritten data field and extracting the cropped portion of the digital image; generating an array of character images for each cropped portion of the digital image, each character image comprising a single character; and creating a pixel intensity array for each character image in the array of character images. In some embodiments, the pixel intensity array comprises a plurality of binary values, wherein a positive binary value indicates a pixel in the character image corresponding to a handwritten area and a negative binary value indicates a pixel in the character image corresponding to a blank area.

In some embodiments, the user-specific character map comprises one or more pixel intensity arrays each corresponding to a single alphanumeric character. In some embodiments, the user-specific character map includes uppercase alphabet characters, lowercase alphabet characters, single-digit numeric characters, and special characters. In some embodiments, retrieving the user-specific character map comprises: identifying an existing user-specific character map associated with the user identifier; determining whether one or more alphanumeric characters are missing from the existing user-specific character map; determining a match between a pixel intensity array for an alphanumeric character in the existing user-specific character map and a pixel intensity array for the same alphanumeric character in one or more other user-specific character maps for other users; selecting pixel intensity arrays that correspond to each of the one or more missing alphanumeric characters from one of the matching other user-specific character maps; and inserting the selected pixel intensity arrays into the existing user-specific character map.

In some embodiments, building a user-specific character map based upon the created pixel intensity arrays comprises inserting each created pixel intensity array that corresponds to a different alphanumeric character into a new user-specific character map; determining whether one or more alphanumeric characters are missing from the new user-specific character map; determining a match between a pixel intensity array for an alphanumeric character in the new user-specific character map and a pixel intensity array for the same alphanumeric character in one or more other user-specific character maps for other users; selecting pixel intensity arrays that correspond to each of the one or more missing alphanumeric characters from one of the matching other user-specific character maps; and inserting the selected pixel intensity arrays into the new user-specific character map.

In some embodiments, the user-specific handwriting classifier comprises a machine learning model executing on the processor of the server computing device that has been trained on one or more prior handwriting samples associated with the user identifier. In some embodiments, a bias factor of the user-specific handwriting classifier is varied according to the one or more prior handwriting samples. In some embodiments, generating digital form data by executing a user-specific handwriting classifier comprises submitting the pixel intensity array for the handwritten data field as input to the machine learning model; validating, by the machine learning model, the characters in the pixel intensity array based upon the user-specific character map and the field type; determining whether a number of validated characters satisfies a predetermined threshold; and generating a computer-readable representation of each validated character in the pixel identity array. In some embodiments, when the number of validated characters falls below the predetermined threshold, the server computing device transmits a notification message to a remote computing device indicating a problem with the handwriting on the physical document. In some embodiments, determining whether a number of validated characters satisfies a predetermined threshold comprises comparing each validated character with one or more characters from the physical document to determine whether an anomaly exists between the validated characters and the one or more characters from the physical document.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
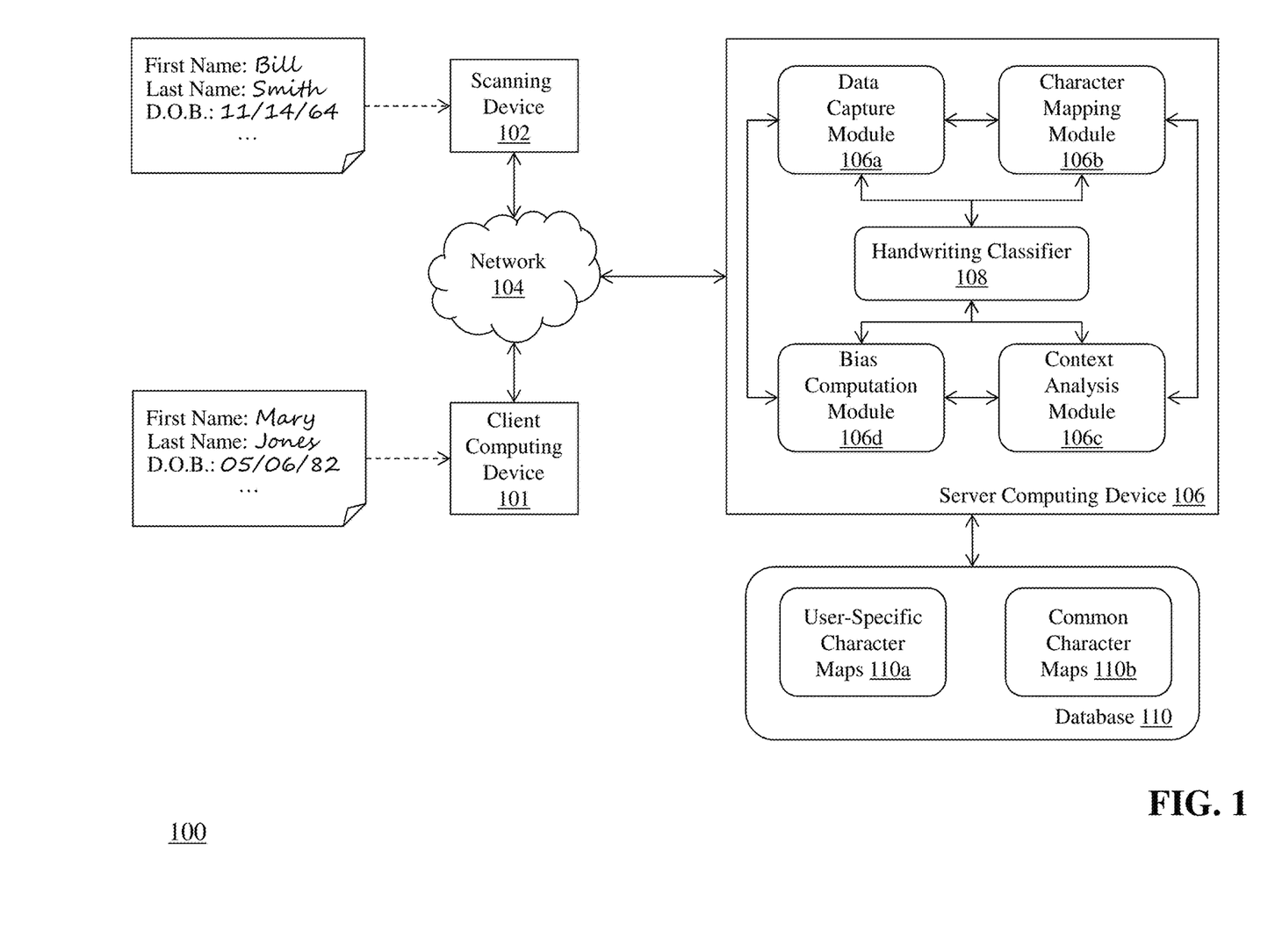
FIG. 1 is a block diagram of a system for recognizing handwritten characters in digital images using context-based machine learning.

FIG. 1 is a block diagram of a system 100 for recognizing handwritten characters in digital images using context-based machine learning. The system 100 includes a client computing device 101 and a scanning device 102 that are each coupled via communications network 104 to a server computing device 106. The server computing device 106 includes a data capture module 106a, a character mapping module 106b, a context analysis module 106c, a bias computation module 106d, and a handwriting classifier 108. The server computing device 106 is coupled to a database 110 that stores one or more user-specific character maps 110a and one or more common character maps 110b.

Exemplary client computing devices 101 include, but are not limited to, tablets, smartphones, laptops, desktops, and other computing devices. It should be appreciated that other types of client computing devices that are capable of connecting to the components of the system 100 can be used without departing from the scope of invention. Although FIG. 1 depicts a single client computing device 101, it should be appreciated that the system 100 can include any number of client computing devices.

The client computing device 101 can execute software applications, such as browser applications. In some embodiments, a browser application comprises software executing on a processor of the client computing device 101 that enables the device to communicate via HTTP or HTTPS with remote servers addressable with URLs (e.g., server computing device 106) to receive content, including one or more webpages, for rendering in the browser application and presentation on a display device embedded in or coupled to the client computing device 101. Exemplary mobile browser application software includes, but is not limited to, Firefox™ Chrome™, Safari™, and other similar software. The one or more webpages can comprise visual and audio content for display to and interaction with a user, that contain data relating to the process of recognizing handwritten characters in digital images using context-based machine learning as described herein.

The scanning device 102 includes hardware and software components that capture and process a digital image corresponding to a physical document that includes one or more areas of handwritten text. Exemplary scanning devices include, but are not limited to, digital cameras (either standalone or embedded in a computing device) and the like. Exemplary file formats for the digitized document include, but are not limited to .PDF, .TIFF, .JPG, .GIF, and the like. In some embodiments, the scanning device 102 can capture a digital version of the physical document in any of the previously-mentioned digital file formats or convert a captured image file into another format (e.g., .PDF). Although FIG. 1 shows the scanning device 102 coupled to the network 104, it should be appreciated that the scanning device 102 can alternatively be coupled to the client computing device 101 or the server computing device 106 (e.g., via cable).

The communications network 104 enables the other components of the system 100 to communicate with each other in order to perform the process of recognizing handwritten characters in digital images using context-based machine learning as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a combination of hardware, including one or more special-purpose processors and one or more physical memory modules, and specialized software modules—such as modules 106a-106d and classifier 108—that execute on the processor of the server computing device 106, to receive data from other components of the system 100, transmit data to other components of the system 100, and perform functions for recognizing handwritten characters in digital images using context-based machine learning as described herein.

In some embodiments, the modules 106a-106d are specialized sets of computer software instructions programmed onto a dedicated processor in the server computing device 106 and can include specifically-designated memory locations and/or registers for executing the specialized computer software instructions. Further explanation of the specific processing performed by the modules 106a-106d will be provided below.

The handwriting classifier 108 is a neural network-based machine learning model that, when executed on the server computing device 106, is trained using archived handwritten documents (e.g., application forms, correspondence, etc.) from a particular user to accurately and quickly validate user-specific handwriting for that user in subsequently-received documents. As described in detail throughout the specification, the handwriting classifier 108 can operate using a user-specific machine learning model (i.e., based upon user-specific handwriting) or the classifier 108 can operate using a baseline machine learning model that is trained on handwriting samples from other users (i.e., in the event that the system does not have any archived handwriting for a particular user). For the latter case, once the system has received a first document with user-specific handwriting, it can then utilize the analysis of that handwriting in the future by training a user-specific classifier for that user.

The handwriting classifier 108 is advantageously configured to leverage machine learning bias in unique way to analyze user-specific handwriting more quickly than traditional systems. Generally, machine learning bias that leads to good results is desirable, although too much bias can result in a situation where the model's predictions underfit what the actual data indicates. In the case of user-specific handwriting recognition, it should be appreciated that the training data does not vary greatly because it is single origin (the user). Therefore, the machine learning model described herein is less complex than typical handwriting recognition models.

In contrast, a generalized handwriting recognition solution must learn from more nuanced training data sourced from many different individual users, thus requiring a more complex model (e.g., a polynomial regression model) that is designed to deal with multifaceted, quirky data. In user-specific handwriting recognition, the quirks are minimized or—appropriately—personalized. For example, the collection of an individual user's strokes for an uppercase letter "A" may seem like a quirky outlier when compared to a general data set that includes handwriting for multiple different persons. But when the same uppercase letter is only compared to the same individual user's past handwriting samples, it is shown to be a common recurrence—not unique at all in the given context.

Additionally, since the user's handwriting is typically culled largely from parametric forms, the handwriting classifier 108 can use the context of each field in a form to great effect. For example, a zip code field or phone number field must be comprised of only digits (e.g., 0-9); therefore, eliminating the need to disambiguate between numbers and letters. This reduces the training time of the machine learning model because the problem of classification is simplified—i.e., input for this kind of data must be classified as only one of ten possible characters, omitting special characters (e.g., *, &, %, and the like) and letters.

Also, to leverage bias successfully in user-specific handwriting recognition, the handwriting classifier 108 utilizes the technique of regularization, which incentivizes the machine learning model against complexity. This incentive introduces bias in the model for simplicity rather than complexity. Once the user-specific handwriting recognition model is properly biased, the problem of classification of an individual user's handwritten characters can be addressed through ensemble learning where multiple specialized classifiers work on the problem as a committee, thereby solidifying confidence and providing accuracy in classification. This approach reduces variance in the model while preserving the bias against complexity, and thus, enhancing the accuracy of the model's predictions.

The database 110 comprises transient and/or persistent memory for data storage that is used in conjunction with the process of recognizing handwritten characters in digital images using context-based machine learning as described herein. Generally, the database 110 is configured to receive, generate, and store specific segments of data recognizing handwritten characters in digital images using context-based machine learning. As shown in FIG. 1, the database 110 stores one or more user-specific character maps 110a and one or more common character maps 110b. As described in greater detail below, the user-specific character maps 110a comprise a set of each of the alphabetical characters, numbers, and special characters that have been received on handwritten documents and analyzed by the system 100, while the common character maps 110b comprise a set of alphabetical characters, numbers, and special characters for one or more users that are stylistically similar and have been aggregated into a character map As will be described below, the common character maps 110b can serve multiple purposes—analyzing handwriting for users that have not submitted any handwritten forms and augmenting existing user-specific character maps that may have one or more missing characters. In some embodiments, all or a portion of the database 110 can be integrated within the server computing device 106 or be located on a separate computing device or devices. For example, the database 110 can comprise a database such as MySQL™ available from Oracle Corp. of Redwood City, Calif.

Figure 2:
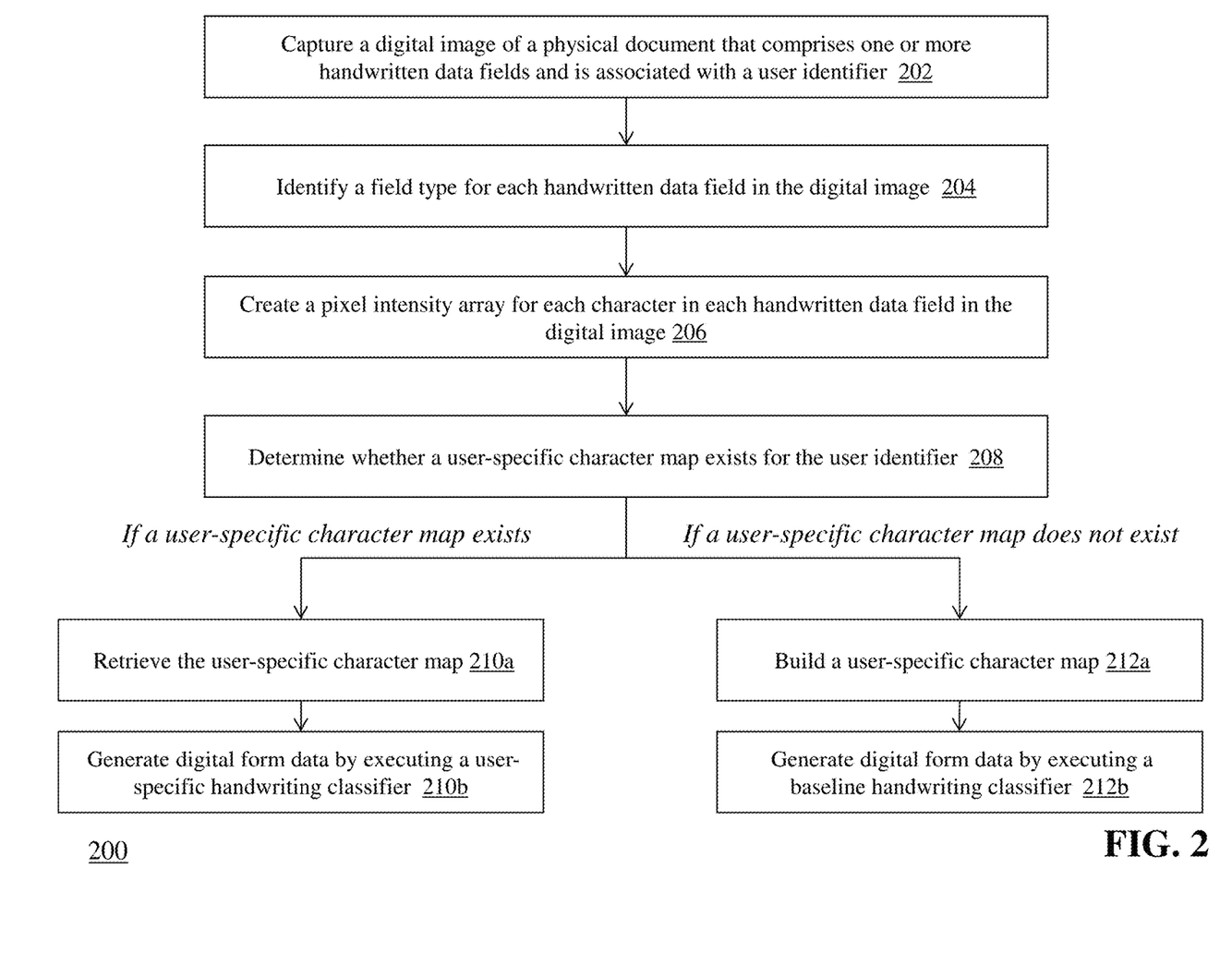
FIG. 2 is a flow diagram of a computerized method of recognizing handwritten characters in digital images using context-based machine learning.

FIG. 2 is a flow diagram of a computerized method 200 of recognizing handwritten characters in digital images using context-based machine learning, using the system 100 of FIG. 1. The data capture module 106a of the server computing device 106 captures (202) a digital image of a physical document that comprises one or more handwritten data fields. In one example, a user at client computing device 101 can enter write data onto a physical paper document, scan the handwritten document (e.g., into a digital image file using scanning device 102) and transmit the digital image file to the data capture module 106a. It should be appreciated that although FIG. 1 depicts the data capture module 106a as part of the server computing device 106, in some embodiments the functionality of the data capture module 106a is located on the client computing device 101 and/or the scanning device 102.

Figure 3:
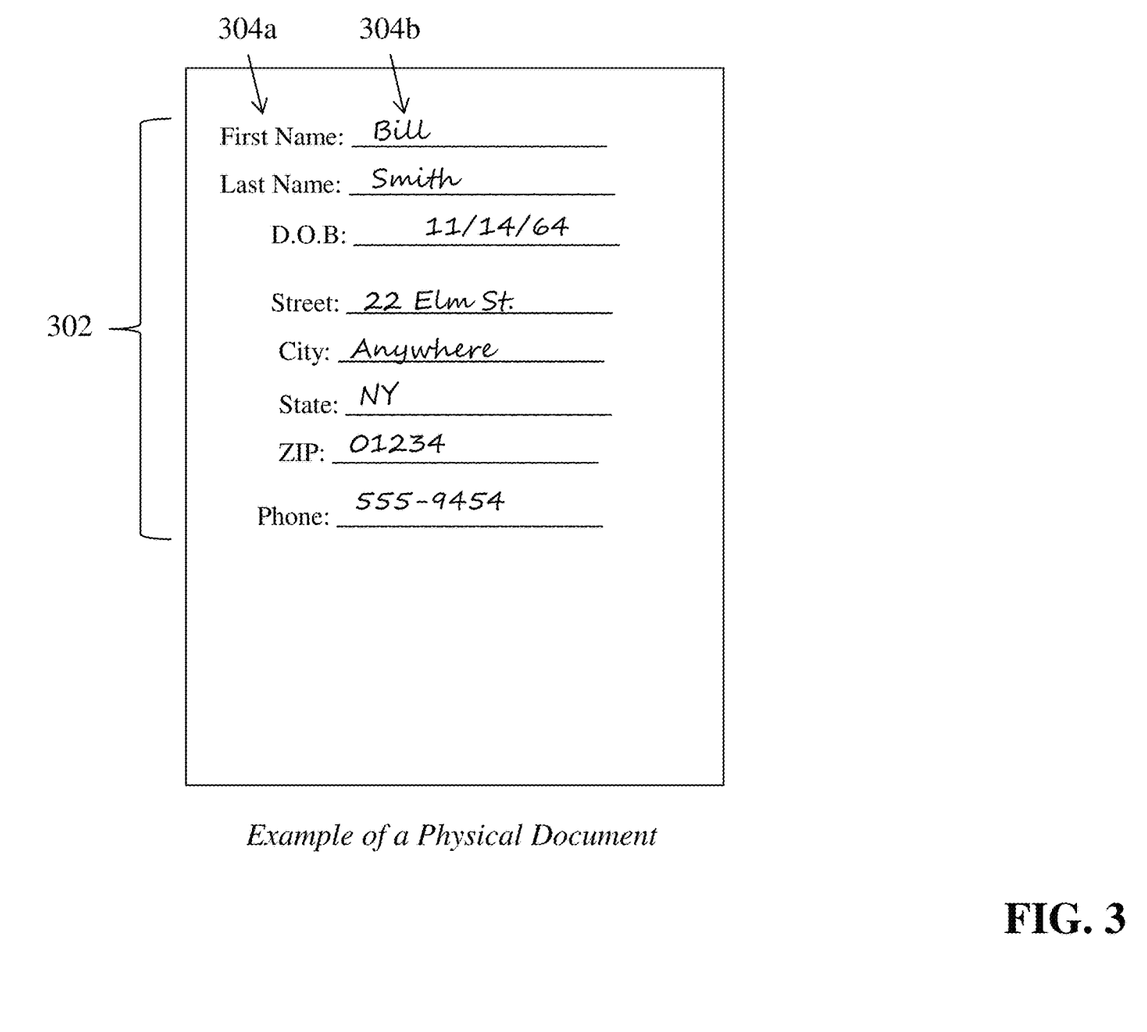
FIG. 3 is an exemplary physical document that contains user handwriting.

An exemplary physical document is shown in FIG. 3. In some embodiments, the physical document comprises a plurality of form fields 302 that each includes a label (e.g., 304a) and an input area (e.g., 304b). The label can be a descriptor that indicates what type of data is stored in the form field. The input area is a blank, fillable area where the user can provide handwritten data corresponding to the associated label. For example, as shown in FIG. 3, a form field may have the label "First Name" 304a, and the user can provide his or her first name (e.g., "Bill") as handwriting in the corresponding input area 304b. The physical document can also include a user identifier (e.g., a user ID number or other type of unique identifier) that enables the data capture module 106a to associate the physical document with an existing user, such as locating a user profile for the identifier in the database 110. In some embodiments, the data capture module 106a can compare one or more data elements in the physical document to known user information (e.g., name, address, D.O.B., etc.) in order to identify the user whose handwriting is in the document.

Once the data capture module 106a has captured a digital image of the physical document, the character mapping module 106b and context analysis module 106c process the digital image to locate the handwritten data and pre-process the handwritten data for analysis by the handwriting classifier 108. During the pre-processing phase, the character mapping module 106b identifies (204) a field type for each handwritten data field in the digital image and creates, for each handwritten data field in the digital image, a pixel intensity array for each character in the handwritten data field.

The field type denotes the specific type of characters that are expected or allowed in the particular handwritten data field. As mentioned above, a ZIP code data field must contain only numbers (and in some cases, one special character (i.e., dash, '-')) in the U.S.; no letters are allowed. Therefore, the context analysis module 106c can locate the handwritten data field for ZIP code in the digital image and identify that the field type is numeric—meaning that the characters in that handwritten data field can be analyzed against numbers and not letters. In some embodiments, the physical document can be associated with predefined metadata (e.g., a layout description that defines x-y coordinates in the document for particular data fields) stored in database 110, and the context analysis module 106c (or, in some embodiments, the data capture module 106a) can retrieve the metadata from the database 110 upon capturing the digital image of the document. For example, the physical document may include a form ID, a barcode, or other type of identifying mark that is used to uniquely identify the document. The module 106c can use the identifying mark to locate the metadata in the database 110, and then transmit the layout (or other information about the location of each handwritten data field in the image) to the character mapping module 106b.

The context provided to the system by the identification of field type is important for the improved efficiency and speed of the handwriting classification as described herein. For example, because each handwritten data field has a field type, the system can therefore exploit the field type to rapidly classify the handwriting: for example, a date of birth field is numeric only, so the handwriting classifier 108 can consider only the problem of classifying handwritten numbers for data obtained from this field. This avoids the misinterpretation of letters and numbers that look similar to human cognition, such as uppercase letter "B" interpreted as number "8" and vice versa, uppercase letter "O" interpreted as number "0" and vice versa.

In addition, in some embodiments if a field type cannot be determined for particular handwritten data field, the context analysis module 106c can analyze one or more other data fields around the handwritten data field at issue to determine a predicted field type for that data field. For example, the context analysis module 106c (or in some embodiments, the data capture module 106a) can search the digital image for one or more other handwritten data fields that have a similarity to one or more of: the location of the handwritten data field, a length of the handwritten data field, or a character type of the handwritten data field. The module 106c can assign a matching probability to each of the one or more other handwritten data fields in the search, and then retrieve metadata (e.g., field type) associated with a context of the other handwritten data field that has a highest matching probability value.

Figure 4A:
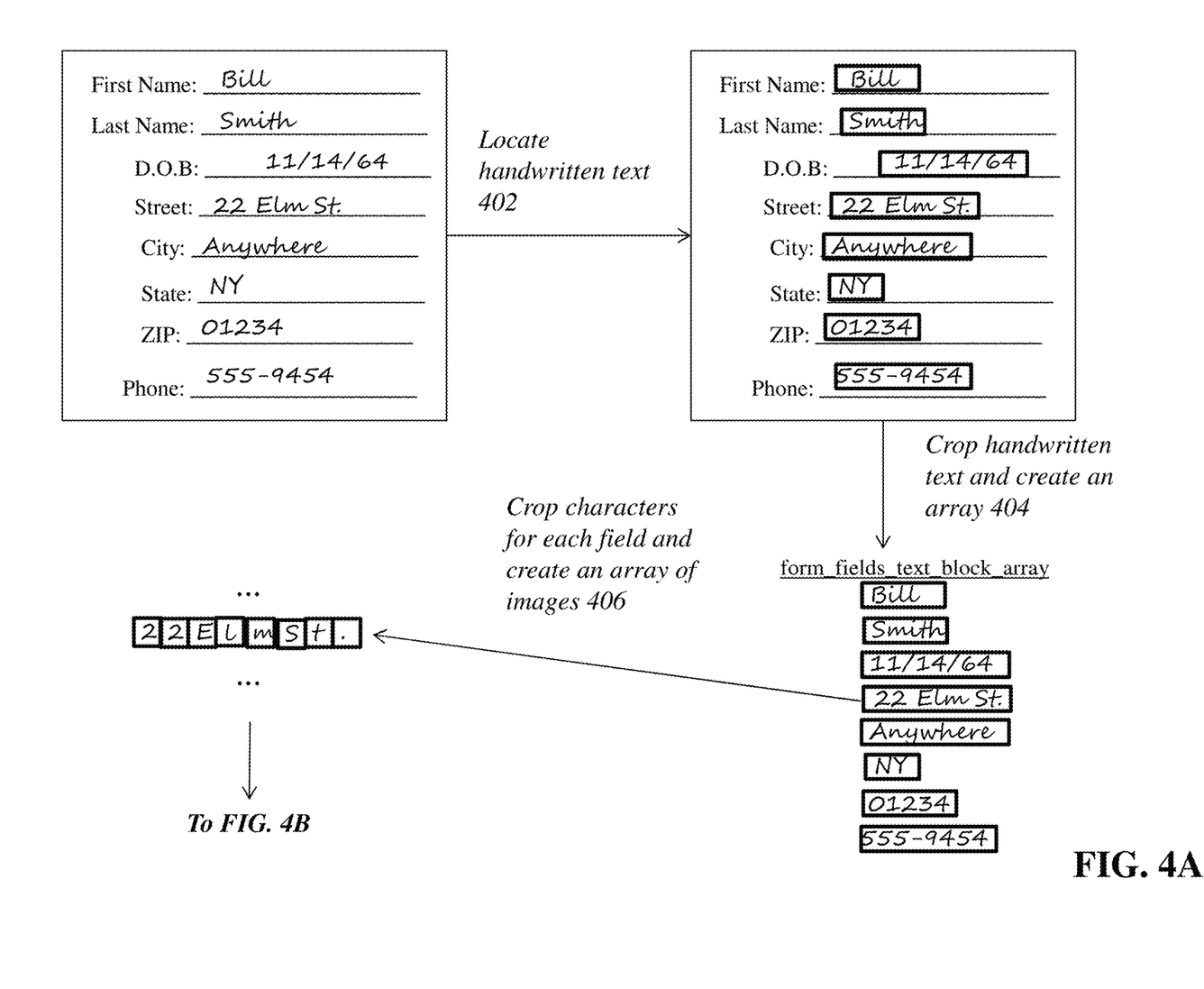
FIGS. 4A-4B comprise a flow diagram of a pre-processing phase for handwritten data fields in a digital image.
Figure 4B:
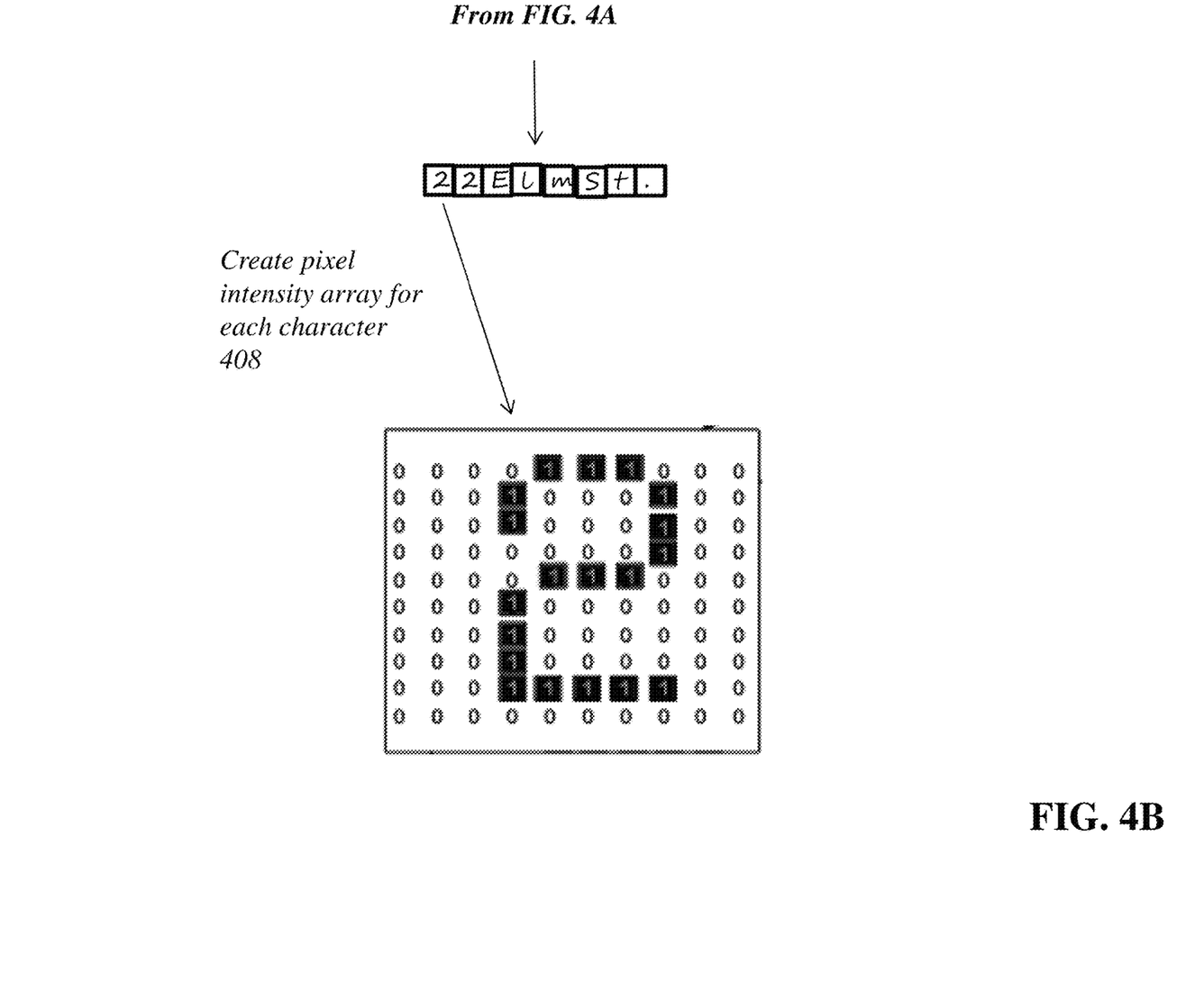

FIGS. 4A-4B comprise a flow diagram of the pre-processing phase for the handwritten data fields in a digital image. The context analysis module 106c locates (402) blocks of handwritten text in the digital image—in FIG. 4A, the blocks of handwritten text located by the module 106c are shown with a black border. The context analysis module 106c crops (404) the digital image at each of the located blocks of handwritten text and creates an array of the cropped images. The context analysis module 106c then creates (406) an array of individual character images for each of the cropped handwritten text block images. For example, as shown in FIG. 4A, the module 106c crops a handwritten text block image of "22 Elm St." into eight subimages, each corresponding to a character in the text block image—i.e., [2], [2], [E], [1], [m], [5], [t], and [.]. The module 106c performs this step for each of the handwritten text block images cropped from the original digital image. In some embodiments, the module 106c can remove the special characters from one or more handwritten data fields if desired.

Turning to FIG. 4B, after the context analysis module 106c has generated the array of character images for each handwritten data field image, the context analysis module 106c creates (408) a pixel intensity array for each character in the handwritten data field. The module 106c analyzes each pixel in the character image and represents the pixels in a binary array (e.g., 10×10 array) where a value of '0' corresponds to a blank area and a value of '1' corresponds to a handwritten area. As shown in FIG. 4B, the module 106c converts the handwriting in the first character image (i.e., the number two) into a corresponding pixel intensity array.

Once the module 106c has completed the pre-processing phase and generated the pixel intensity arrays for each character in each handwritten data field as described above, the character mapping module 106b determines (208) whether a user-specific character map exists for the user identifier. The module 106b can search the user-specific character maps 110a in the database 110 to identify a character map that is associated with the particular user.

It should be appreciated that the system may receive physical documents from users in at least two categories: users that have submitted one or more handwritten documents before, and users that have not submitted any handwritten documents before. For the former category of users, in some embodiments the character mapping module 106b performs different analysis of the handwritten text than for the latter category of users.

If the user has submitted handwritten documents before, the user has a user-specific character map already generated and stored in the database 110. Therefore, the character mapping module 106b can retrieve (210a) the user-specific character map for that user from the database 110. As explained above, the user-specific character map comprises the pixel intensity arrays for a plurality of different handwritten characters previously submitted by the user. Generally, the character map comprises a pixel intensity array for each of the following: uppercase letters (i.e., A to Z), lowercase letters (i.e., a to z), numbers (i.e., 0 to 9), and in some embodiments, special characters that may be used in handwritten text (i.e., '-', '&', '@ ' and the like).

However, it should be appreciated that in some cases, a user-specific character map may be missing one or more pixel intensity arrays for certain characters—for example, if the user has not submitted any handwriting samples with a character (e.g., uppercase Z), then that character would not be present in the user-specific character map. In this instance, the character mapping module 106b retrieves one or more common character maps 110b from the database 110 whose pixel intensity arrays have similar features to the pixel intensity arrays in the user-specific character map. The module 106b can then fill in the pixel intensity arrays for the missing characters in the user-specific character map with the pixel intensity arrays from the selected common character maps. The step of filling in missing pixel intensity arrays in a user-specific character map can be performed in the receiving step 210a, or in the generating digital form data step 210b described later in the specification.

Figure 5:
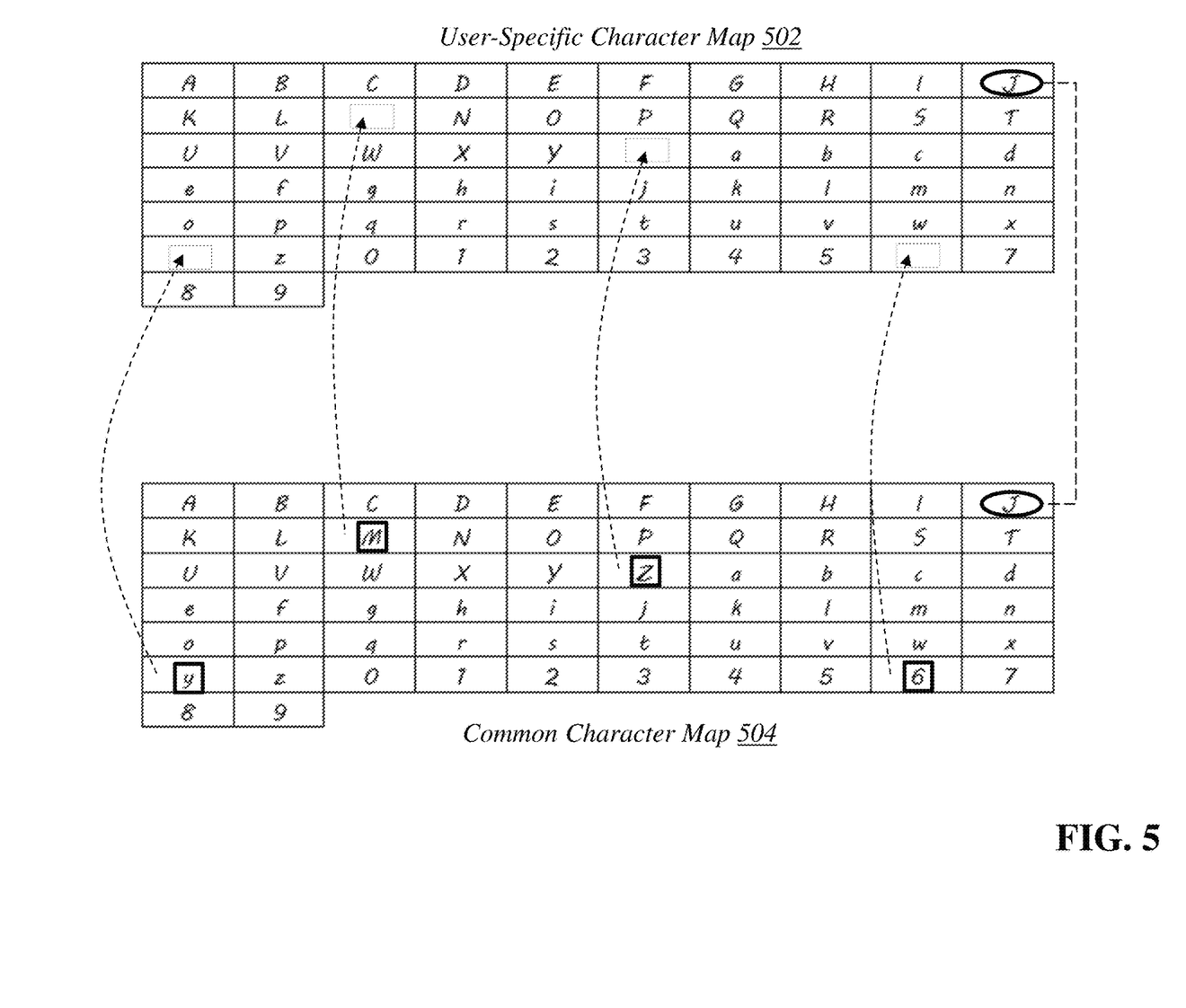
FIG. 5 is a diagram of an exemplary user-specific character map that has one or more missing pixel intensity arrays for specific characters.

FIG. 5 is a diagram of an exemplary user-specific character map that has one or more missing pixel intensity arrays for specific characters. As shown in FIG. 5, the user specific character map 502 is missing pixel intensity arrays for uppercase M, uppercase Z, lowercase y, and number 6. The character mapping module 106b selects a common character map 504 that has one or more pixel intensity arrays that match (or are similar to) one or more corresponding pixel intensity arrays in the user-specific character map 502. For example, the module 106b can determine that uppercase J in the user-specific character map 502 is almost exactly the same as uppercase J in the common character map 504. The module 106b can determine that the corresponding pixel intensity arrays from the common character map 504 can be used to fill in the missing pixel intensity arrays in the user-specific character map 502. It should be appreciated that the character mapping module 106b can perform the matching process above using any number of different techniques, such as but not limited to: comparing pixel intensity arrays of corresponding characters in the respective user-specific and common maps; generating an overall similarity score between all of the pixel intensity arrays in the respective user-specific and common maps; and the like.

As noted above, in some instances the handwritten document is associated with a user that has not previously submitted any documents to the system 100, and as such, a user-specific character map does not exist in the database 110 for that user. In these instances, the character mapping module 106b does not retrieve a user-specific character map for that user; instead, the module 106b builds (212a) a user-specific character map based upon the created pixel intensity arrays from the digital image.

Figure 6:
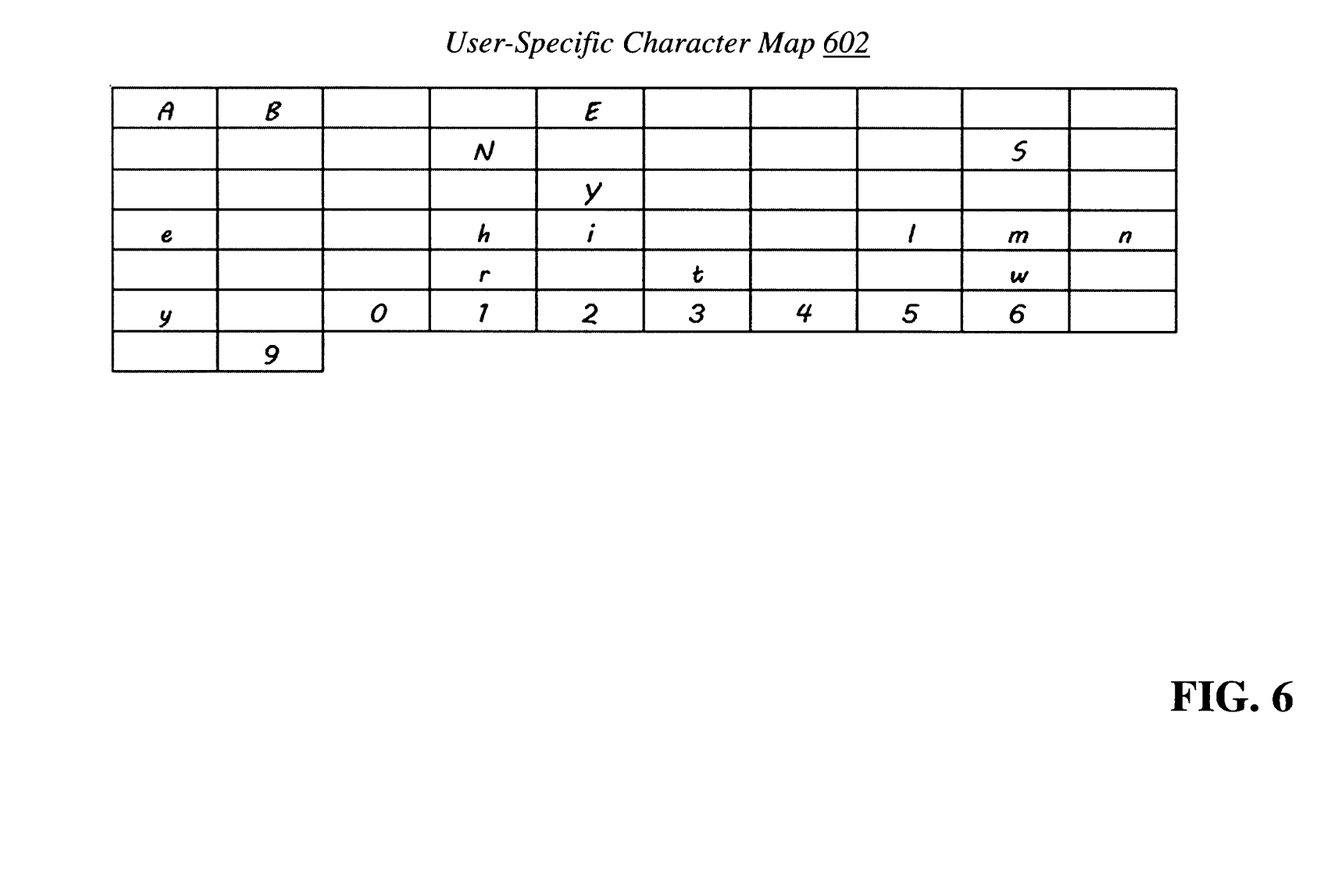
FIG. 6 is an exemplary character map for a user that has not previously submitted handwritten data.

The character mapping module 106b inserts each created pixel intensity array that corresponds to a different letter, number, or special character into a new user-specific character map. Using the example document in FIG. 3, the module 106b inserts a pixel intensity array, generated from the physical document, for each unique uppercase letter, lowercase letter, number and special character captured from the document into the new character map. FIG. 6 is an exemplary character map 602 generated by the character mapping module 106b from the document of FIG. 3. As shown in FIG. 6, many of the pixel intensity arrays are missing from the user-specific character map 602 because those characters did not appear in the physical document captured by the system and the user has not submitted any prior handwriting samples or handwritten documents to the system.

The character mapping module 106b determines whether one or more alphanumeric characters are missing from the new user-specific character map. Upon determining that there are missing characters, the module 106b retrieves one or more common character maps 110b from the database 110 whose pixel intensity arrays have similar features to the pixel intensity arrays in the user-specific character map 602. The module 106b can then fill in the pixel intensity arrays for the missing characters in the user-specific character map with the pixel intensity arrays from the selected common character maps.

The module 106b determines a match between a pixel intensity array for an alphanumeric character in the new user-specific character map and a pixel intensity array for the same alphanumeric character in one or more other user-specific character maps for other users and selects pixel intensity arrays that correspond to each of the one or more missing alphanumeric characters from one of the matching other user-specific character maps. The module 106b then inserts the selected pixel intensity arrays into the new user-specific character map.

Once the user-specific character map is retrieved (210a) or built (212b), the character mapping module 106b transmits the user-specific character map, the pixel intensity arrays for the characters in each handwritten data field from the digital image, and the field type (and/or related metadata) for each handwritten data field to the handwriting classifier 108, which is executed to analyze the pixel intensity arrays for the characters in each handwritten data field—using the information in the user-specific character map and the field type information—to validate the pixel intensity arrays, confirm that the handwriting in the physical document is indeed from the particular user, and generate (210b/212b) digital form data corresponding to the handwritten text in the physical document.

As set forth above, when the user has previously submitted handwriting documents to the system, the handwriting classifier 108 has been trained using the user-specific character map and the classifier is then applied to the pixel intensity arrays for the characters in each handwritten data field from the digital image. As part of this process, the bias computation module 106d analyzes the user-specific character map and provides a bias regularization value to the handwriting classifier 108 that adapts the analysis performed by the classifier 108 to account for user-specific features in the handwriting. The bias computation module 106d injects bias into the model by making assumptions about the user's writing that would not generalize to a population of users. This affects the neural network by making it highly specialized to the user's handwriting. An example set of inputs to the bias computation module 106d would be characteristics that are unique to the user—for example, a characteristic marker of how that user writes the number three, for example. An exemplary methodology for addressing the bias-variance dilemma and using bias in machine learning generally is available at https://ml.berkeley.edu/blog/2017/07/13/tutorial-4, which is incorporated herein by reference.

In the cases where the user has not previously submitted handwriting documents to the system, the handwriting classifier 108 has not yet been trained on user-specific handwriting. Therefore, the classifier 108 can default to a baseline machine learning model that uses some information from the pixel intensity arrays captured from the newly-submitted physical document and also utilizes information from pixel intensity arrays in the common character map 110b that is used to fill in the new user-specific character map for this user. For example, the newly-submitted physical document can be analyzed to classify the characters in it using the common character map.

The bias computation module 106d also receives feedback from the handwriting classifier 108 with respect to the analysis performed on the user-specific handwriting—including related field type/contextual information and the character maps used—in order to automatically and dynamically adjust the bias regularization value for the particular user (and in some embodiments, for other users). In this way, the system 100 advantageously and continuously learns from its handwriting classification processing in order to refine the analysis for improved speed, accuracy, and completeness. The continuous learning of the classifier in system 100 is facilitated by running periodic "training" sessions whereby the feedback from the bias computation model, for example, is used as training data. The bias computation module can be assumed to provide feedback labeled as either "pass" or "fail", and this data can be used to teach the system to avoid failures in the future by providing examples of failures and successes. If there is a "fail," the bias computation model can fine-tune the bias factor for future iterations.

After the handwriting classifier 108 has analyzed the pixel intensity arrays as described above, the classifier 108 generates (210b) digital form data corresponding to the handwritten fields in the digital document. In one embodiment, the classifier 108 can generate computer-readable, standardized data (e.g., ASCII characters) that correspond to the handwritten data and store the computer-readable data in a file (e.g., XML, JSON) in database 110. The data capture module 106a can then analyze the digital form data to determine whether any discrepancies exist (e.g., missing or corrupt data, etc.). If the data capture module 106a determines that the computer-readable data is in good order (meaning that it is complete and verified), the data capture module 106a can transmit the data to another computing device for processing.

For example, once the data capture module 106a stores the computer-readable data with a label that the data is "in good order", the data (typically, a document) is then assigned to a computerized workflow action item for another computing system coupled to the system 100 to fulfill a request—e.g., open an account, execute a transaction, and the like. Another example when the physical document is an "adding a check-writing feature to an account" form; the computer-readable data from this document is used to generate a computerized workflow action item for another computing system to configure the privileges on the account profile and issue a checkbook. Another example when the physical document is an "adding joint owner to an account" form; if the module 106a determines that the computer-readable data in "good order," then the computer-readable data is used to generate a computerized workflow action item to another computing system to create an entry in the account's data repository to add the joint account owner. In some embodiments, a business workflow data structure, stored in the database 108, defines the next action for the form data in "good order". The data structure can define specific rules and triggers that execute automated processing (e.g., a script file) to initiate the next action.

In the event that the computer-readable data is determined to be "not in good order," the data capture module 106a assigns a not-in-good-order status to the computer-readable data and generates a computerized workflow action item for another computing system to perform a subsequent action. For example, in the case of a physical document that corresponds to an "adding check-writing feature" form, the computerized workflow action item can comprise issuing an API call to a remote computing system to generate a response notification (e.g., SMS, email, etc.) to the user that submitted the form of incomplete or inaccurate data.

In addition to the above improvements, the data capture module 106a can store the newly-received handwriting data (e.g., the digital image of the physical document and/or the cropped images described above) for retraining the handwriting classifier 108 for the particular user. In some embodiments, before the retraining occurs, the system 100 can conduct a threat analysis on the handwriting data to beneficially determine whether any fraud or forgery may have occurred on the physical document. As part of the threat analysis, the system 100 can test the existing handwriting machine learning model for the user, using the newly-received handwriting data. Poor test results can indicate an aberration in handwriting, which may be attributed to any of a number of different issues:

Someone is writing the forms on the user's behalf;

The user's fine motor skills have undergone deterioration;

The user is using a different kind of handwriting input method (e.g., a new pen, finger, stylus, etc.).

At this point, the system 100 can trigger a forensic analysis of the results to ensure against fraud and forgery, and safeguard the customer against risky financial decisions made in the midst of—and possibly attributed to—cognitive decline. If analysis determines the aberration is legitimate, then the handwriting data that raised the flag is destroyed. On the other hand, if the issue was a false flag and cleared, this most recently received handwritten data can be incorporated to retrain the customer's model, perpetually enhancing its intelligence and ability to recognize the customer's handwriting while protecting against fraud and impaired decision-making.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for recognizing handwritten characters in digital images using context-based machine learning, the system comprising:
    a server computing device including a memory for storing programmatic instructions and a processor for executing the programmatic instructions, and
    a database coupled to the server computing device, the processor of the server computing device executing the programmatic instructions to:
    capture a digital image of a physical document that comprises one or more handwritten data fields, the physical document associated with a user identifier;
    identify a field type for each handwritten data field in the digital image;
    create, for each handwritten data field in the digital image, a pixel intensity array for each character in the handwritten data field;
    determine whether a user-specific character map exists for the user identifier;
    if a user-specific character map exists for the user identifier:
    retrieve the user-specific character map, and
    generate, for each handwritten data field in the physical document, digital form data by executing a user-specific handwriting classifier using the user-specific character map, the created pixel intensity array for the handwritten data field, and the field type for the handwritten data field; or
    if a user-specific character map does not exist for the user identifier:
    build a user-specific character map based upon the created pixel intensity arrays, and generate, for each handwritten data field in the physical document, digital form data by executing a baseline handwriting classifier using the built user-specific character map, the created pixel intensity array for the handwritten data field, and the field type for the handwritten data field.

2. The system of claim 1, wherein identifying a field type for each handwritten data field in the digital image comprises:
    determining a location of each handwritten data field in the digital image;
    mapping the location of each handwritten data field in the digital image to layout data associated with the physical document, the layout data comprising a field type for each handwritten data field in the digital image;
    identifying the field type for each handwritten data field in the digital image based upon the mapped location; and
    retrieving metadata associated with a context of each handwritten data field in the digital image.

3. The system of claim 2, wherein retrieving metadata associated with a context of each handwritten field in the digital image comprises, for each handwritten data field in the digital image:
    if metadata associated with a context of the handwritten data field exists:
    retrieve the metadata;
    if metadata associated with a context of the handwritten data field does not exist:
    search the digital image for one or more other handwritten data fields that have a similarity to one or more of: the location of the handwritten data field, a length of the handwritten data field, or a character type of the handwritten data field;
    assign a matching probability to each of the one or more other handwritten data fields in the search; and
    retrieve metadata associated with a context of the other handwritten data field that has a highest matching probability value.

4. The system of claim 1, wherein creating a pixel intensity array for each character in the handwritten data field comprises:
    detecting each handwritten data field in the digital image;
    cropping a portion of the digital image at each detected handwritten data field and extracting the cropped portion of the digital image;
    generating an array of character images for each cropped portion of the digital image, each character image comprising a single character; and
    creating a pixel intensity array for each character image in the array of character images.

5. The system of claim 4, the pixel intensity array comprising a plurality of binary values, wherein a positive binary value indicates a pixel in the character image corresponding to a handwritten area and a negative binary value indicates a pixel in the character image corresponding to a blank area.

6. The system of claim 1, wherein the user-specific character map comprises one or more pixel intensity arrays each corresponding to a single alphanumeric character.

7. The system of claim 6, wherein the user-specific character map includes uppercase alphabet characters, lowercase alphabet characters, single-digit numeric characters, and special characters.

8. The system of claim 1, wherein retrieving the user-specific character map comprises:
  identifying an existing user-specific character map associated with the user identifier;
  determining whether one or more alphanumeric characters are missing from the existing user-specific character map;
  determining a match between a pixel intensity array for an alphanumeric character in the existing user-specific character map and a pixel intensity array for the same alphanumeric character in one or more other user-specific character maps for other users;
  selecting pixel intensity arrays that correspond to each of the one or more missing alphanumeric characters from one of the matching other user-specific character maps; and
  inserting the selected pixel intensity arrays into the existing user-specific character map.

9. The system of claim 1, wherein building a user-specific character map based upon the created pixel intensity arrays comprises:
  inserting each created pixel intensity array that corresponds to a different alphanumeric character into a new user-specific character map;
  determining whether one or more alphanumeric characters are missing from the new user-specific character map;
  determining a match between a pixel intensity array for an alphanumeric character in the new user-specific character map and a pixel intensity array for the same alphanumeric character in one or more other user-specific character maps for other users;
  selecting pixel intensity arrays that correspond to each of the one or more missing alphanumeric characters from one of the matching other user-specific character maps; and
  inserting the selected pixel intensity arrays into the new user-specific character map.

10. The system of claim 1, wherein the user-specific handwriting classifier comprises a machine learning model executing on the processor of the server computing device that has been trained on one or more prior handwriting samples associated with the user identifier.

11. The system of claim 10, wherein a bias factor of the user-specific handwriting classifier is varied according to the one or more prior handwriting samples.

12. The system of claim 11, wherein generating digital form data by executing a user-specific handwriting classifier comprises:
  submitting the pixel intensity array for the handwritten data field as input to the machine learning model;
  validating, by the machine learning model, the characters in the pixel intensity array based upon the user-specific character map and the field type;
  determining whether a number of validated characters satisfies a predetermined threshold; and
  generating a computer-readable representation of each validated character in the pixel identity array.

13. The system of claim 12, when the number of validated characters falls below the predetermined threshold:
  transmitting a notification message to a remote computing device, the notification message indicating a problem with the handwriting on the physical document.

14. The system of claim 12, wherein determining whether a number of validated characters satisfies a predetermined threshold comprises comparing each validated character with one or more characters from the physical document to determine whether an anomaly exists between the validated characters and the one or more characters from the physical document.

15. A computerized method of recognizing handwritten characters in digital images using context-based machine learning, the method comprising:
  capturing, by a server computing device, a digital image of a physical document that comprises one or more handwritten data fields, the physical document associated with a user identifier;
  identifying, by the server computing device, a field type for each handwritten data field in the digital image;
  creating, by the server computing device, for each handwritten data field in the digital image, a pixel intensity array for each character in the handwritten data field;
  determining, by the server computing device, whether a user-specific character map exists for the user identifier;
  if a user-specific character map exists for the user identifier:
    retrieving, by the server computing device, the user-specific character map, and generating, by the server computing device, for each handwritten data field in the physical document, digital form data by executing a user-specific handwriting classifier using the user-specific character map, the created pixel intensity array for the handwritten data field, and the field type for the handwritten data field; or
  if a user-specific character map does not exist for the user identifier:
    building, by the server computing device, a user-specific character map based upon the created pixel intensity arrays, and
    generating, by the server computing device, for each handwritten data field in the physical document, digital form data by executing a baseline handwriting classifier using the built user-specific character map, the created pixel intensity array for the handwritten data field, and the field type for the handwritten data field.

16. The method of claim 15, wherein identifying a field type for each handwritten data field in the digital image comprises:
  determining a location of each handwritten data field in the digital image;
  mapping the location of each handwritten data field in the digital image to layout data associated with the physical document, the layout data comprising a field type for each handwritten data field in the digital image;
  identifying the field type for each handwritten data field in the digital image based upon the mapped location; and
  retrieving metadata associated with a context of each handwritten data field in the digital image.

17. The method of claim 16, wherein retrieving metadata associated with a context of each handwritten field in the digital image comprises:
  for each handwritten data field in the digital image:
    if metadata associated with a context of the handwritten data field exists:
      retrieve the metadata;
    if metadata associated with a context of the handwritten data field does not exist:
      search the digital image for one or more other handwritten data fields that have a similarity to one or more of: the location of the handwritten data field, a length of the handwritten data field, or a character type of the handwritten data field;

assign a matching probability to each of the one or more other handwritten data fields in the search; and retrieve metadata associated with a context of the other handwritten data field that has a highest matching probability value.

18. The method of claim 15, wherein creating a pixel intensity array for each character in the handwritten data field comprises:

detecting each handwritten data field in the digital image;

cropping a portion of the digital image at each detected handwritten data field and extracting the cropped portion of the digital image;

generating an array of character images for each cropped portion of the digital image, each character image comprising a single character; and creating a pixel intensity array for each character image in the array of character images.

19. The method of claim 18, the pixel intensity array comprising a plurality of binary values, wherein a positive binary value indicates a pixel in the character image corresponding to a handwritten area and a negative binary value indicates a pixel in the character image corresponding to a blank area.

20. The method of claim 15, wherein the user-specific character map comprises one or more pixel intensity arrays each corresponding to a single alphanumeric character.

21. The method of claim 20, wherein the user-specific character map includes uppercase alphabet characters, lowercase alphabet characters, single-digit numeric characters, and special characters.

22. The method of claim 15, wherein retrieving the user-specific character map comprises:

identifying an existing user-specific character map associated with the user identifier;

determining whether one or more alphanumeric characters are missing from the existing user-specific character map;

determining a match between a pixel intensity array for an alphanumeric character in the existing user-specific character map and a pixel intensity array for the same alphanumeric character in one or more other user-specific character maps for other users;

selecting pixel intensity arrays that correspond to each of the one or more missing alphanumeric characters from one of the matching other user-specific character maps; and inserting the selected pixel intensity arrays into the existing user-specific character map.

23. The method of claim 15, wherein building a user-specific character map based upon the created pixel intensity arrays comprises:

inserting each created pixel intensity array that corresponds to a different alphanumeric character into a new user-specific character map;

determining whether one or more alphanumeric characters are missing from the new user-specific character map;

determining a match between a pixel intensity array for an alphanumeric character in the new user-specific character map and a pixel intensity array for the same alphanumeric character in one or more other user-specific character maps for other users;

selecting pixel intensity arrays that correspond to each of the one or more missing alphanumeric characters from one of the matching other user-specific character maps; and inserting the selected pixel intensity arrays into the new user-specific character map.

24. The method of claim 15, wherein the user-specific handwriting classifier comprises a machine learning model executing on the processor of the server computing device that has been trained on one or more prior handwriting samples associated with the user identifier.

25. The method of claim 24, wherein a bias factor of the user-specific handwriting classifier is varied according to the one or more prior handwriting samples.

26. The method of claim 25, wherein generating digital form data by executing a user-specific handwriting classifier comprises:

submitting the pixel intensity array for the handwritten data field as input to the machine learning model;

validating, by the machine learning model, the characters in the pixel intensity array based upon the user-specific character map and the field type;

determining whether a number of validated characters satisfies a predetermined threshold; and generating a computer-readable representation of each validated character in the pixel identity array.

27. The method of claim 26, when the number of validated characters falls below the predetermined threshold:

transmitting a notification message to a remote computing device, the notification message indicating a problem with the handwriting on the physical document.

28. The method of claim 26, wherein determining whether a number of validated characters satisfies a predetermined threshold comprises comparing each validated character with one or more characters from the physical document to determine whether an anomaly exists between the validated characters and the one or more characters from the physical document.

* * * * *